Sept. 30, 1952      L. S. WILLIAMS      2,612,415
PIVOT BEARING
Filed April 9, 1946      3 Sheets-Sheet 1
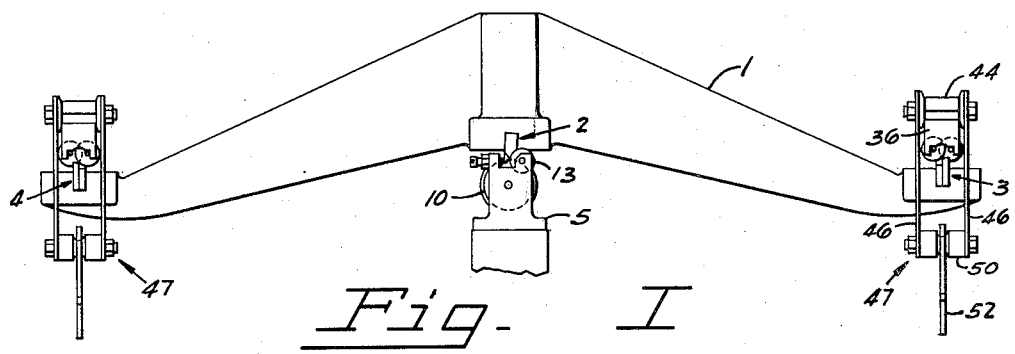
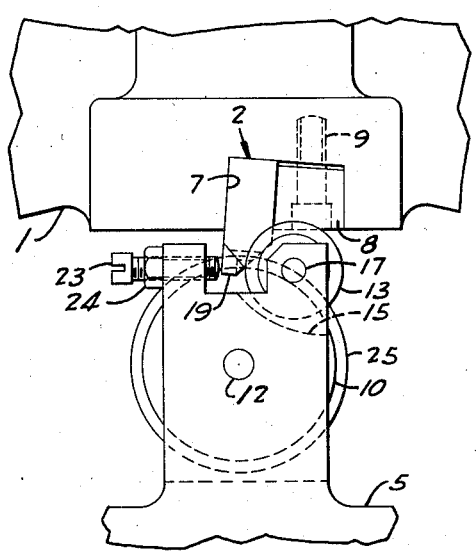
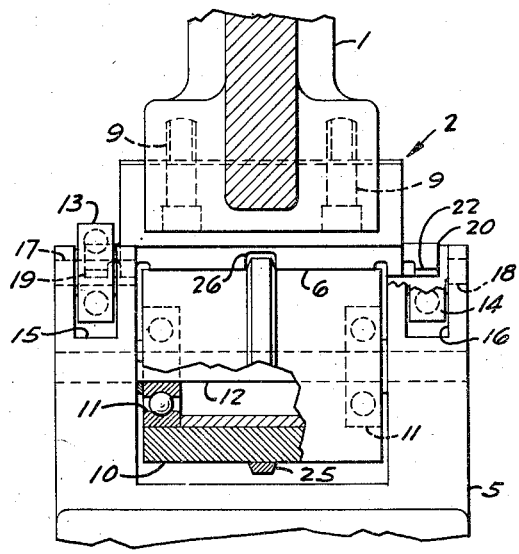
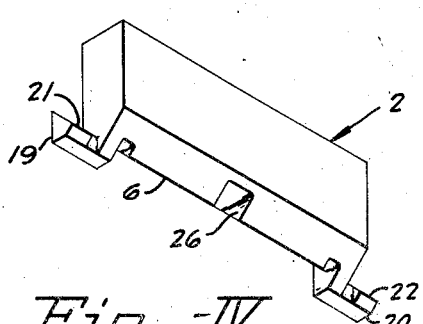
INVENTOR.
Lawrence S. Williams
BY
Marshall and Marshall
ATTORNEYS Sept. 30, 1952 — L. S. WILLIAMS — 2,612,415
PIVOT BEARING
Filed April 9, 1946 — 3 Sheets-Sheet 2
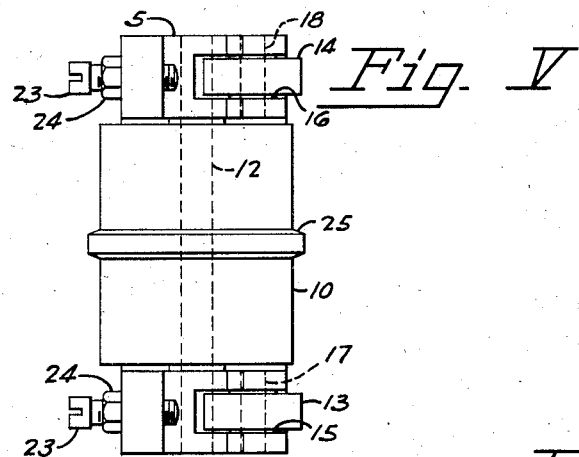
Fig. V
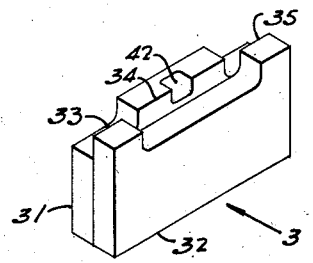
Fig. VIII
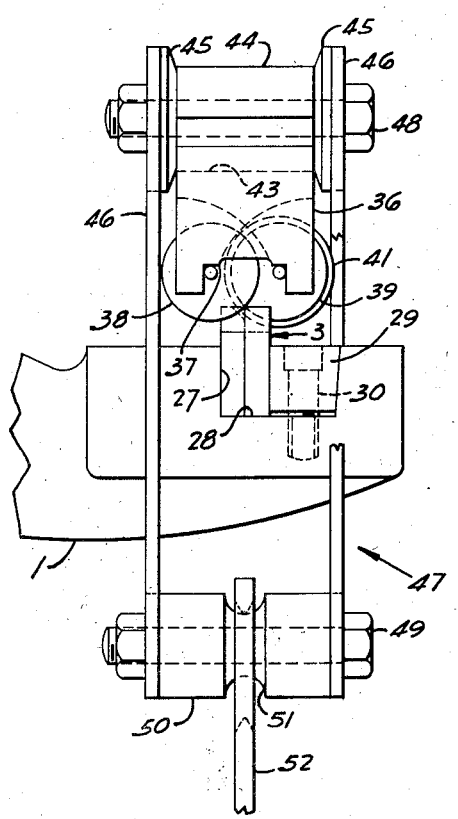
Fig. VI
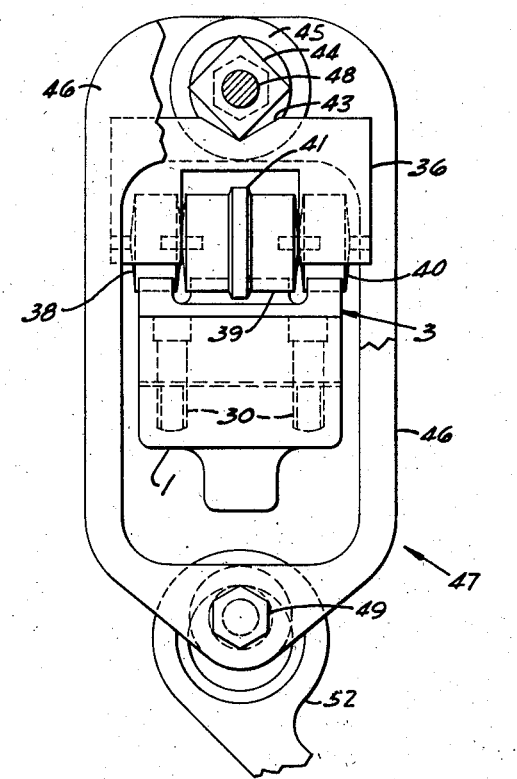
Fig. VII
INVENTOR.
Lawrence S. Williams
BY
Marshall and Marshall
ATTORNEYS Sept. 30, 1952  L. S. WILLIAMS  2,612,415
PIVOT BEARING
Filed April 9, 1946  3 Sheets-Sheet 3
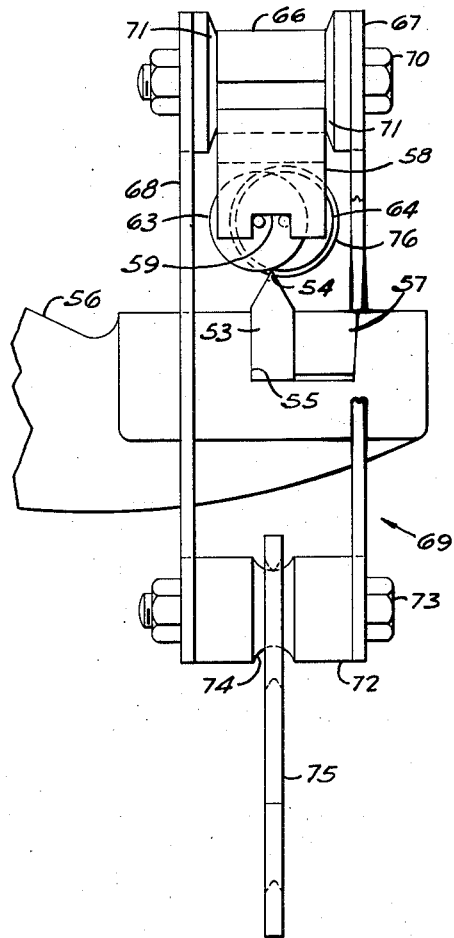
Fig. IX
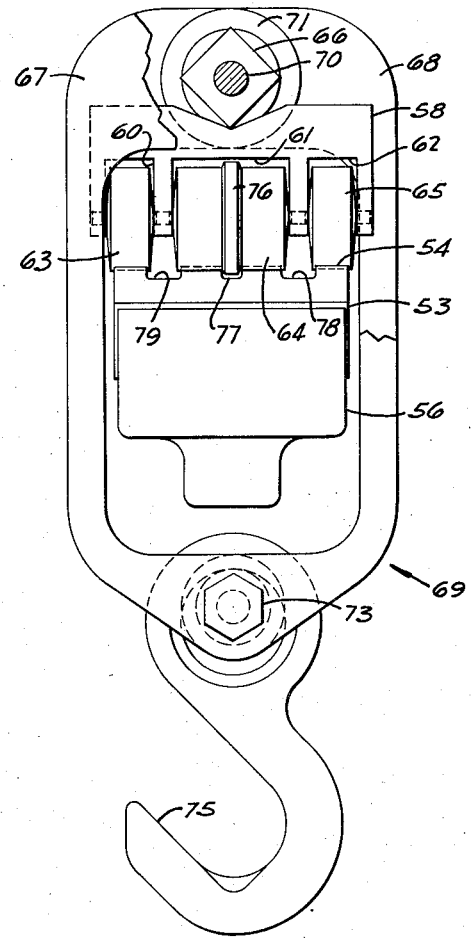
Fig. X
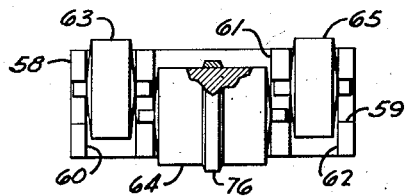
Fig. XI
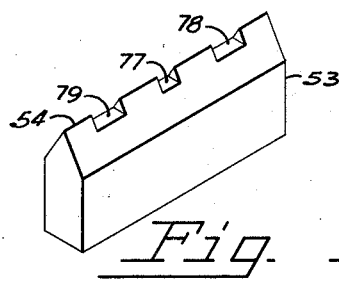
Fig. XII
INVENTOR.
Lawrence S. Williams
BY
Marshall and Marshall
ATTORNEYS Patented Sept. 30, 1952

2,612,415

UNITED STATES PATENT OFFICE 2,612,415

PIVOT BEARING

Lawrence S. Williams, Toledo, Ohio, assignor to Toledo Scale Company, Toledo, Ohio, a corporation of New Jersey Application April 9, 1946, Serial No. 660,829

2 Claims. (Cl. 308—2)

This invention relates to weighing scales and in particular to improvements in the pivots and bearings used to transmit forces to the lever.

Two general classes of connections have been used to apply forces to a weighing scale lever. The first of these classes is represented by an ordinary ball bearing. When used for applying load to a lever a ball bearing provides a positively located turning point, but it is subject to friction. The friction is largely due to the rubbing contact between the bearing balls and the retaining cage or spacer if one is used or between the bearing balls themselves if no spacer is used. It is this friction of a ball bearing which prevents its use in high precision weighing apparatus.

The second class of pivotal connections to a weighing scale lever are represented by the ordinary knife edge pivot resting either on a plane bearing or in the valley of a V-bearing. A knife edge resting on a plane has the least friction of any known pivotal connection but it is subject to derangement if acted upon by lateral forces. Therefore any weighing scale using knife edges resting on flat or plane bearings must have a relieving and arresting gear to locate the knife edges on the plates immediately prior to each weighing. To avoid the complication of the relieving gear common commercial constructions use a knife edge resting in the valley of a V-bearing. The slopes of the sides of the V are great enough so that if the bearing or pivot is temporarily displaced it will slide back to approximately its correct position. A knife edge resting in a V-bearing is subject to a change error, a type of error which is rarely found in a ball bearing connection and which is only occasionally found in a knife edge and plane bearing connection. The change error results when the load is not equally distributed across the thickness of the edge of the knife edge pivot. If a knife edge pivot were infinitely sharp and formed as an intersection of two precisely plane surfaces (so that it is a truly straight line), the knife edge has no thickness and, therefore, there can be no change error. However sharp a knife edge may be originally it is deformed under load until the edge is approximately semicylindrical having a small but finite radius. Under certain conditions such as may occur if there is dirt in the valley of the V-bearing or if the knife edge rests against one of the inclined surfaces of the V-bearing, the load is not carried through the center of the knife edge but the center of pressure lies to one side or the other of the edge. This shift in the center of pressure against the knife edge appears as a change in ratio of the lever and causes an error in the indication of the scale. While this condition is most noticeable with knife edges resting in V-bearings it is occasionally observed when the knife edges rest on flat surfaces. It is probably caused by a lack of truth in the relieving mechanism such that the knife edges do not always contact the same elements of the surface of the plane bearing.

The principal object of this invention is to provide a pivot and bearing construction whose friction error is comparable to that of a knife edge resting on a plane surface and whose change error is comparable to that of the ball bearing.

Another object of the invention is to provide a pivot and bearing assembly comprising a knife edge resting on a surface movable along a line lying in the plane of the lever movement and means for holding the knife edge in position on the movable surface.

Another object of the invention is to provide a plurality of inclined movable surfaces to cooperate with a sharp edged pivot.

A still further object of the invention is to provide a pivot and bearing assembly of which the knife edge of the pivot rests on the hardened external periphery of a freely rotatable roller.

An ancillary object is to provide a raised ring near the center of the movable roller which engages the edges of a notch in the knife edge to hold the knife edge against endwise movement.

These and other objects and advantages are attained in weighing mechanisms constructed according to the invention, preferred embodiments of which are illustrated in the accompanying drawings.

The invention consists in providing a knife edged pivot for a lever, a surface freely movable along a line lying generally in the plane of the lever movement, and means for holding the lever in position in space with respect to pivotally connected bodies without restraining movement of the pivot supporting surface or surfaces.

In the preferred embodiment of the invention the pivot comprises a piece of hardened material whose lower surface is beveled to form a knife edge. The freely movable surface is the outer surface of a hardened steel roller which is journaled on an axis lying generally below and parallel to the knife edge of the pivot. Antifriction bearings may be used to journal the roller if the utmost in precision and freedom from friction is required. The means for restraining the lever against endwise motion may conveniently be knife edges whose edges are in line with the load supporting knife edge and are directed in a generally horizontal direction to bear against surfaces that are freely movable in a vertical direction. These latter surfaces may be the peripheries of a pair of auxiliary rollers. The load supporting knife edge instead of being exactly in the same vertical plane as the axle of the load supporting roller is displaced toward the auxiliary rollers so as to generate a positive force tending to hold the auxiliary knife edges against the auxiliary rollers.

In some modifications of the improved pivot and bearing the load is divided equally between the principal and auxiliary rollers. In one modification a laminated type of pivot is employed and in another modification a straight-through in-line pivot is used and the roller axles are brought sufficiently close together so that a very shallow V is formed by the intersections of the peripheries of the various rollers.

In the preferred form and in each of the modifications a steel ring shrunk on the center or principal load supporting roller engages a notch cut in the pivot and functions as a thrust bearing to prevent endwise movement of the pivot on the bearing.

A weighing scale illustrating preferred embodiments of the invention is shown in the accompanying drawings.

In the drawings:

Figure I is a front elevation of an even arm balance whose pivotal connections are constructed according to the invention.

Figure II is an enlarged fragmentary front elevation of the fulcrum pivot and bearing of the improved weighing scale.

Figure III is an end elevation partly in section of the fulcrum pivot and bearing illustrated in Figures I and II.

Figure IV is a perspective view of the improved pivot.

Figure V is a plan of the fulcrum bearing.

Figure VI is a front elevation of one of the ends of the lever showing a pivot and bearing constructed according to the invention.

Figure VII is an end view of one end of the lever and the stirrup pivotally supported thereon.

Figure VIII is a perspective view of a laminated pivot used as a terminal knife edge for the lever shown in Figure I.

Figure IX is a front elevation of one end of the lever showing an alternative form of knife edge and bearing.

Figure X is an end elevation of the modified form of pivot and bearing.

Figure XI is a plan view of the modified bearing.

Figure XII is a perspective view of the pivot to be used with the bearings shown in Figure XI.

These specific figures and the accompanying description are intended to merely illustrate the invention but not to impose limitations on the claims.

For purposes of illustration the improved pivot and bearing is shown embodied in a simple even arm balance. A lever 1 having a central or fulcrum pivot 2 and terminal pivots 3 and 4 is supported on a fulcrum stand 5. The construction of the fulcrum pivot 2 and the bearing in the fulcrum stand 5 is shown in Figures II, III, IV and V. Referring to Figures II and IV in particular the fulcrum pivot 2 has the greater portion of the length of its lower edge beveled to form a knife edge 6. In the embodiment shown the beveled sides of the pivot 2 forming the knife edge 6 meet at right angles. The upper surface of the pivot 2 is machined square with respect to the sides so that it may be accurately located in a notch 7 cut in the lever 1. A wedge 8 drawn into position by screws 9 is used to positively locate and secure the pivot 2 in the lever. The knife edge portions 6 of the pivot 2, being directed downwardly, rests on the periphery of a hardened roller 10 which by means of ball bearings 11 is journaled on an axle 12. The knife edge 6 and the axle 12 are maintained parallel to each other so that the knife edge may rest along an element of the cylindrical surface of the roller 10.

Since the roller 10 is free to rotate and the knife edge 6 is located above the axle 12 the system comprising the knife edge 6 and the roller 10 alone is unstable. Means are therefore provided to maintain the lever in position. In the embodiment shown these means consist of a pair of ball bearings 13 and 14 which are mounted in grooves 15 and 16 with their axles 17 and 18 lying parallel to the axle 12 of the principal roller 10 and at substantially the same elevation as the periphery of the roller 10 against which the knife edge rests. The ball bearings 13 and 14 are located so that elements of their peripheries are in line with the knife edge 6 when the knife edge rests on the roller 10. Extensions 19 and 20 of the pivot 2 are provided with knife edge portions 21 and 22 which are in line with the knife edge 6 and are directed horizontally so as to bear against the ball bearings 13 and 14. To insure positive positioning of the knife edges 21 and 22 against the ball bearings 13 and 14 the line of the knife edge 6 is located between the ball bearings 13 and 14 and a vertical plane through the center of the axle 12 on which the roller 10 is journaled. Thus, the tendency of the roller 10 to turn under the force of the load holds the end knife edges 21 and 22 firmly in contact and thus positively positions the pivot 2 and the lever 1 with respect to the fulcrum stand 5.

Stop screws 23 held in adjusted position by lock nuts 24 prevent the knife edge 6 from rolling away from the auxiliary rollers or ball bearings 13 and 14 and are adjusted to provide sufficient clearance so that when the parts are in their correct position they do not interfere with the free movement of the pivot.

Endwise movement of the pivot on the bearing which in conventional scales is prevented by thrust plates bearing against the ends of the pivots is prevented in the improved bearing by a thrust ring 25 that has a wedge shaped cross section, is made of a hard material, and is shrunk on the roller 10 after each has been hardened and ground. The sides of a notch 26 cut transversely through the center of the knife edge 6 extending perpendicular to the knife edge 6 straddle the thrust ring 25.

Other portions of the knife edge 6 are also eliminated so that in every case the length of a knife edge is less than the length of the bearing surface against which the knife edge rests. This arrangement is preferable to having the knife edge longer than the bearing because the greater part of the wear occurs on the portions of the knife edge contacting the bearing. If the knife edge is the shorter of the two, any wear of the knife edge will not affect the linearity of the line of contact between the knife edge and the bearing. If the knife edge is longer than the bearing only those portions of the knife edge in contact with the bearing become worn. Endwise shifting of the pivot with respect to the bearing then brings sharp and worn portions of the knife edge simultaneously in contact with the bearing and, since these sharp and worn portions define different contact lines, friction develops. The difference in wear along the length of a pivot which overhangs its bearing is equivalent to lack of truth or bending of the pivot either of which tends to cause sliding of portions of the pivot on its bearing or movements of the bearing if the bearing is of the self-aligning type.

The construction shown in Figures I to V inclusive combines the freedom from friction of a knife edge resting on a flat bearing with the accuracy of positioning afforded by a ball bearing type of pivotal connection. The surface of the roller is convex but since the relatively small section against which the pivot rests may be considered as being flat the construction is equivalent to a knife edge resting on a plane. Regardless of the portion of the periphery of the roller 10 that may be engaged the conditions remain the same. The end rollers, which take a small amount of lever end thrust act in the same manner. The essential requirement to secure low friction in this type of a pivot and bearing is that all sliding of one surface against another shall be eliminated. If the rollers were clamped or otherwise incapable of turning, this construction would show more friction than a conventional knife edge and V-bearing. This is because the rollers, in end elevation, define a sharp V in which the knife edge, which actually is a portion of a cylindrical surface of a very small radius rests so that the pivot acts the same as a small shaft resting and turning in a V notch. By giving the bearing surfaces mobility no portion of the knife edge is forced to slide on its bearing but is completely free to roll thereon as the bearing surface moves. The longitudinal separation of the knife edge sections and their cooperation with independent rollers permit the knife edges to be honed or ground until the respective turning centers or axes are precisely in line. If this condition is reached the pivot can turn on the bearing without causing any movement of the bearing surfaces. However, this condition is practically impossible to attain and even if attained could not be maintained after the knife edge has been used a few times. Therefore, if friction is to be eliminated, the bearing surfaces must be independently movable.

Another feature of this pivot and bearing construction which contributes toward its low friction characteristic is the full length support afforded the pivot by its full contact with the load supporting roller 10. By supporting the pivot throughout its length there is little tendency for the pivot to bend and thus attempt to contact the bearing surface along a curved line rather than a straight line. It is only by having full support for both pivot and bearing that deflections may be eliminated and a straight pivoting axis maintained.

The provision of the thrust ring at the center of the bearing contributes to the low friction characteristics by confining the thrust receiving elements to the pivot line of the knife edge 6 and surface of the bearing roller 10. The location at the center of the knife edge has a minimum of movement and therefore a minimum of friction.

A slightly different construction embodying the same principles is used for the pivotal connections at the ends of the lever 1. Each end of the lever is provided with a notch whose vertical side 27 and bottom 28 are precisely located with respect to the knife edge 6 of the fulcrum pivot 2. The pivot 3, of laminate construction, is clamped in the notch by a wedge 29 which is secured by screws 30. The laminated pivot 3, shown in detail in Figure VIII, is composed of two flat hardened members 31 and 32. One of the members, the member 31 in the figure, has portions of one side adjacent the corners cut away to leave an upwardly directed projection extending along about half of the length of the pivot. The other of the members has its central part cut away to leave upwardly extending projections adjacent its ends. The juxtaposed surfaces of the members 31 and 32 are ground flat and smooth and they are then welded together. After welding, the upper surface composed of the ends of the projections is also ground flat and smooth. In this manner three aligned knife edges 33, 34 and 35 are formed by the intersection of the plane dividing the members 31 and 32 from each other and the plane containing the surfaces of the projections. These planes are at right angles to each other and, since the grinding to form each is a simple machine operation, are essentially true planar surfaces. Their intersection is, therefore, a straight line so that the three knife edges are automatically formed in correct alignment.

A bearing resting on the pivot 3 comprises a bearing block 36 whose lower surface has a groove 37 cut the lengthway of the block and three wide grooves cut transversely to the groove 37. Of the latter grooves the end ones are cut in from one side of the block while the center one is cut in from the opposite side. Three hardened rollers 38, 39 and 40 having integrally formed axles are positioned in the bearing block 36 with the axles of the rollers journaled in the corners of the lengthwise extending groove 37. The rollers 38 and 40 are located in the end ones of the transverse grooves while the roller 39, whose length is equal to the combined lengths of the other two rollers, is located in the center transverse groove. When the bearing block 36 and the rollers are placed on the pivot 3 the rollers 38 and 40, the end rollers, rest against the knife edges 33 and 35 of the laminated pivot 3. The longer roller 39 rests against the knife edge 34 of the pivot.

The spacing between the axles of the rollers and the diameters of the rollers are selected so that in end elevation the peripheries of the rollers intersect each other at substantially right angles. Since the axles of the rollers are in the same horizontal plane the normals to the peripheries of the rollers at the points of intersection are inclined substantially 45 degrees either side of the vertical. The pivot 3 is mounted in the lever so that the knife edges 33, 34 and 35 are normal to the surface of the rolls against which they bear.

Lateral movement of the knife edge with respect to the bearing and rollers is prevented by the engagement between a tapered thrust ring 41 shrunk on the roller 39 and a notch 42 cut in the knife edge 34.

The upper surface of the bearing block 36 has a transverse V groove 43 in which one corner of a square cross section spacer 44 is allowed to rest. Conical washers 45 space side plates 46 of a stirrup 47 from the ends of the square cross section spacer 44. The side plates 46 and the spacers 44 and 45 are held together by a bolt 48 which must be drawn up tight so that the square cross section spacer 44 cannot turn. The lower end of the side plates 46 are held together by a bolt 49 which draws them against the end of a generally cylindrical spacer 50. The cylindrical spacer 50 at the lower end of the stirrup has a groove 51 at its center which serves to locate a commodity hook 52. The side plates 46 of the stirrup 47 each have large windows through which the end of the beam 1 may project to bring the pivot 3 into engagement with the rollers 38, 39 and 40.

The pivot 3 with the bearing and stirrup illustrates a type of construction in which the load is divided equally between the long center knife edge and the two shorter end knife edges all of which are located in alignment in the pivot. The pivot is supported throughout most of its length so that it is relatively free from bending stresses. The bearings are free to rotate except that they are restrained by the friction of their axles against the sides and bottom of the groove in the bearing block. While this construction probably has more friction than the fulcrum bearing previously described, it illustrates a possible simplification where simplicity and low cost of manufacture must be considered at the expense of the utmost in accuracy.

Still another form of pivot and bearing construction is illustrated in Figures IX to XII inclusive. This form differs from that previously described in that it employs a one-piece through-type pivot and that the rollers are spaced closer together so that in end elevation their peripheries intersect at an obtuse angle, in the example approximately 150 degrees. In this construction a pivot 53 having a 60 degree knife edge 54 formed on its upper surface is held in a notch 55 cut in the end of a lever 56. The pivot 53 is held in place by a wedge 57 which may be drawn down with a screw or merely driven into place.

A bearing block 58 is formed with a straight sided groove 59 extending longitudinally and three cross grooves 60, 61 and 62 extending laterally through its lower surface perpendicular to the groove 59. The cross grooves are of sufficiently great depth to accommodate rollers 63, 64 and 65 whose axles are journaled in the corners of the longitudinal groove 59.

The bearing block 58 has a transverse V groove in its upper surface in which one corner of a square cross section spacer 66 rests. The spacer 66 is clamped between side members 67 and 68 of a stirrup 69 by means of a tightened bolt 70, the spacer 66 being separated from the side members 67 and 68 by a pair of conically faced washers 71. The lower ends of the side members 67 and 68 of the stirrup are spread by a cylindrical spacer 72 and are clamped by a tightened bolt 73. A groove 74 cut in the middle of the cylindrical spacer 72 locates and supports a commodity hook 75. The side members 67 and 68 each have openings of sufficiently great area to allow the end of the lever 56 to be inserted therethrough so that the knife edge 54 of the pivot 53 may engage the rollers in the bearing block.

The center of the middle roller 64 is provided with a tapered thrust ring 76 which by loosely engaging a notch 77 cut in the middle of the knife edge 54 of the pivot 53 serves as a thrust bearing. The knife edge 54 of the pivot 53 is partly removed by notches 78 and 79 so that in each case the length of the knife edge is less than the length of the roller against which it rests.

In this construction the lines of action of the forces between the knife edge and the rollers are normal to the surfaces of the rollers but are not symmetrically located in the cross section of the pivot 53. However, the axles of the rollers are brought sufficiently close together so that the lines of action of the forces lie between the sides of the knife edge. This is necessary to minimize any bending forces tending to deflect the edge of the knife edge. The closer together the axles of the rollers are brought the less will be the horizontal force tending to bend the edge of the knife but the improvement is gained at the sacrifice of lateral restoring force, i. e. a force tending to hold the stirrup against movement along the length of the lever.

Each of the above constructions secures the advantage of precisely positioning a knife edge with respect to a bearing without introducing any objectionable friction. Each of the bearings consists of independently mobile surfaces arranged so that in end elevation they present a sharp bottomed V in which the knife edge may rest. The examples illustrate constructions in which the greater part of the load is carried by one knife edge and other constructions in which the load is divided equally between the rollers forming the sides of the V-bearing. Each of the constructions obtains the advantages of a knife edge resting on a flat surface and of continuously positioning the knife edge on that surface. From the constructions shown the possibility of using right-angled or obtuse-angled knife edges and still swinging the lever through a comparatively large arc is readily apparent. This last advantage is gained because the knife edges rest against convex surfaces rather than on a plane or in the concave valley of an ordinary V-bearing.

Various modifications may be made in the improved pivot and bearing without departing from the spirit and scope of the invention.

Having described the invention, I claim:

1. In a device for pivotally connecting two members for the transmission of force therebetween, in combination, a first roller of substantial length journaled with its axis generally perpendicular to the line of force, auxiliary rollers one at each end of the first roller positioned with their axes spaced from and parallel to the axis of the first roller so that the roller peripheries overlap, a pivoting member that has a principal knife edge resting against an element of the first roller and auxiliary knife edges resting against the auxiliary rollers, and a raised band around the first roller which band engages a notch in the principal knife edge to prevent longitudinal movement of the knife edge.

2. In a device of the class described, in combination, a member having a sharp edge serving as a pivot, a bearing surface that supports the sharp edge of the member and that is freely movable in a direction generally parallel to the surface and perpendicular to the sharp edge of the member, means including a second sharp edge of the member aligned with the pivot edge and engaging auxiliary bearing surfaces for preventing movement of the member in the direction of free movement of the bearing surface, and a ridge on the bearing surface that engages a notch in the sharp edge of the member for preventing longitudinal movement of the member.

LAWRENCE S. WILLIAMS.

REFERENCES CITED

The following references are of record in the file of this patent:

UNITED STATES PATENTS

| Number | Name | Date |
| --- | --- | --- |
| 1,583,251 | Hem | May 4, 1926 |
| 1,718,534 | Curtis | June 25, 1929 |
| 1,722,948 | Tanner | July 30, 1929 |
| 2,273,769 | Harding et al. | Feb. 17, 1942 |

FOREIGN PATENTS

| Number | Country | Date |
| --- | --- | --- |
| 315,559 | Great Britain | of 1929 |